United States Patent [19]

Frick et al.

[11] 4,200,059
[45] Apr. 29, 1980

[54] ANIMAL SHELTER

[75] Inventors: Alexander Frick, Hof im grossen Riet, Schaan, Liechtenstein; Florin Frick, Schaan, Liechtenstein

[73] Assignee: Alexander Frick, Schaan, Liechtenstein

[21] Appl. No.: 945,705

[22] Filed: Sep. 25, 1978

[30] Foreign Application Priority Data

Sep. 28, 1977 [AT] Austria .................................. 6931/77

[51] Int. Cl.² ............................ A01K 1/00; F24F 7/00
[52] U.S. Cl. ......................................... 119/16; 52/303
[58] Field of Search ....................... 119/15, 16, 19, 20, 119/21; 52/302, 303; 98/31

[56] References Cited

U.S. PATENT DOCUMENTS

| 1,615,964 | 2/1927 | Straight | 119/16 X |
| 2,889,763 | 6/1959 | Pine | 98/31 |
| 3,389,687 | 6/1968 | Trussell | 119/21 |
| 3,677,229 | 7/1972 | Blough et al. | 119/16 |
| 3,919,976 | 11/1975 | Meyer et al. | 119/16 |
| 4,151,811 | 5/1979 | Truhan | 119/21 |

FOREIGN PATENT DOCUMENTS 2260757  9/1975  France ........................................ 119/16

Primary Examiner—Louis G. Mancene
Assistant Examiner—Robert P. Swiatek
Attorney, Agent, or Firm—Toren, McGeady and Stanger

[57] ABSTRACT

The walls of a stable building bound an animal shelter in the building and normally separate the shelter from the ambient atmosphere. A vertically extending wall portion includes an outer shell and an inner shell which define a space therebetween. An opening in the inner shell connects the space with the shelter. A heat exchanger mounted on one of the walls defines first and second, separate conduits. The first conduit connects a portion of the afore-mentioned space remote from the opening with the atmosphere for discharge of exhaust air from the shelter. The second conduit connects the atmosphere with the shelter for flow of fresh air into the shelter in thermal contact with the exhaust air.

12 Claims, 4 Drawing Figures

ANIMAL SHELTER

The invention relates to an agricultural animal shelter or stable building with forced air ventilation, at least one air inlet and at least one air outlet being provided, and the stream of fresh air entering the building passing through a heat exchanger arranged in or near the ceiling and being passed by exhaust air.

Care was taken heretofore in the construction of stable buildings to arrange the insulation of the building in such a manner that no supplemental heating had to be provided for maintaining the required room temperature, and that ventilation, on the other hand, was sufficient to avoid unacceptable concentrations of harmful gases. The knowledge that the energy resources of this earth are not unexhaustible has generated and initiated new considerations and new technical developments which aim not only at reducing the consumption of energy, that is, to burn less fuel, but also have taken into consideration the opportunity not to let the heat produced by the animals to be discharged unused together with the exhausted air, but to reclaim this animal heat in heat exchangers at least in part. By way of example, it may be mentioned that a fattened hog having a live weight of approximately 60 kg gives off 130 Cal./hr. 19,500 Cal. are produced every hour in a stable with 150 fattened hogs, which corresponds approximately to the heating capacity of a detached one-family house. The heat generated by the animals serves primarily for heating the stable in winter. A portion of this amount of heat is needed for covering the heat losses of the structural elements (wall, ceilings, windows, doors, and the like) which enclose the space, and the remainder is consumed in heating the inflowing, cold, external air to the temperature of the stable. In order to minimize heat losses through the space-enclosing structural elements, the buildings were very well insulated so that numerous modern stables are often insulated better than some "modern" blocks of apartments. The heat content of the discharged air is capable of being reclaimed in principle, and at least in theory by heat exchangers in which the cold external air supplied to the stable is warmed by means of the discharged exhaust air. However, the installation of such heat exchangers has involved substantial problems caused partly by the high dust content of the air exhausted from the stable, and partly by the high humidity of the stable exhaust, that is, its high water vapor content. The dust content depends from numerous factors (kind of animals and stable, particulate floor covering, kind of feed, air exchange rate, and the like). The values determined in numerous scientific tests are approximately between 1 and 40 mg/m$^3$ dust content. This high dust content has caused the heat exchangers to be clogged after relatively short periods of operation. Moreover, the moisture content of the stable air is so high that it can reach values above 95% relative humidity in winter. This high moisture content causes the formation of condensed water and ice in the heat exchanger, particularly at the time when the heat exchanger is most urgently needed.

This is the starting point of the invention which aims at feeding the exhaust air to the air exchanger not only as free from dust as possible, but particularly in a dry state. This is achieved according to the invention by a portion of the building wall and of the building ceiling being formed by two shells spaced from each other, by openings communicating with the space between the shells near the floor of the stable for the discharge of the exhaust air, and by this space communicating with the portion of the heat exchanger being passed by the exhaust air. When the air enriched with water vapor in the stable flows through the double-shelled building sections toward the heat exchanger at low external temperatures, the water vapor condenses and is precipitated on the inner face of the outer shell so that relatively dry air reaches the heat exchanger. When the double-shelled building section is of suitably large dimensions, the dwell of the individual air molecules in the double-shelled building sections is relatively long (low flow velocity) so that not only the water vapor contained in the air is precipitated almost completely, but the dust particles present in the air have sufficient time to settle on the surfaces mostly wet by condensation. It will be unavoidable at very low external temperatures that the condensate freezes on the outer shell, but this is not relevant because the flow section is extremely large so that such an ice layer cannot affect the rate of exhaust air discharge to a significant extent.

According to a preferred embodiment of the invention, the two shells consituting the wall and/or ceiling are directly connected with the heat exchanger, or the heat exchanger is set into an opening passing through one of these shells. In view of the proposed arrangement, the heat exchanger can be reached by the flow of exhaust air from all directions. The invention is applicable to stables of rectangular or quadratic cross section. Particularly favorable flow conditions for forced ventilation, however, are capable of being achieved when the building wall and ceiling merge directly in the manner of a cupola or dome, and the heat exchanger is arranged in the top of this cupola or dome-like structure so that conditions at least approaching rotational symmetry are present. Polygonal floor plans may closely approach such conditions with respect to favorable flow ratios. In a preferred embodiment, both the building wall and the building ceiling are constructed from prefabricated, thin-walled shells of metal, asbestos cement, or plastics. With such a mode of construction, the individual shell elements are prefabricated industrially and then transported to the construction site where substantially only assembly operations need to be performed and are limited to the erection and interconnection of the individual elements. Basically, it would also be possible to employ a design in the manner of a double-shelled hall supported by compressed air, as has become known, and such structures also are encompassed by this invention.

Known stable buildings have a round floor plan and an oxidation chamber below the stable floor for receiving and processing the animal excrements. The invention is applied to such stable buildings to particular advantage if the openings for discharge of the exhaust air into the space between the two shells are arranged below the stable floor, and the stable floor itself is formed with slots because the moisture content of the air is particularly high in these installations. The exhausted air passes immediately above the manure which is always kept in the liquid condition whereby the exhaust air is enriched intensively with water vapor. It was always necessary heretofore in such stables to mix the manure with a substantial amount of water to maintain the manure in the state of a liquid capable of being stirred. According to the proposed invention, the condensate precipitated from the exhaust air is returned to the manure, whereby a substantial amount of water is saved. The condensate flows downward along the inner shells and thus reaches the manure collecting chamber. The dust collecting in the space between the shells is flushed downward thereby, an additional essential effect, and also comes into the manure collecting chamber. The side walls of the manure collecting chamber are preferably employed as foundation walls for the shells which constitute the building.

The heat exchanger is designed as a frame or in the manner of a torus, the arrangement being selected in such a manner that the double shells are connected directly to the outside of the heat exchanger so that the exhaust flows toward the circumference of the heat exchanger. To permit cleaning of the heat exchanger under conditions of extremely high dust loading, provisions are made, according to a further feature of the invention, for a rinsing device in the portion of the heat exchanger which is passed by the exhaust air. An annular water line serves for this purpose and is equipped with nozzles in those regions where it passes through the exhaust air chambers of the heat exchanger. The water supply to this annular line may be controlled manually. The heat exchanger is designed in such a manner that the inner, lower bounding wall of the heat exchanger portion to be rinsed is inclined relative to the inner shell and arranged above the same. The rinsing water then flows downward within the heat exchanger and reaches the wall or ceiling shell from which it runs downward and thereby firstly cleans the space between the shells of dust and additionally reaches the liquid manure collecting chamber. The heat exchanger is designed to be readily installed so that it may be disconnected or removed entirely during the summer. The mentioned mode of construction (double-shelled building wall) is of great advantage also in summer. Despite the light and thus inexpensive construction without any structural insulation, overheating of the stable space in summer is avoided because the heat radiated from the outside on the building is entrained and removed by the exhaust air which continuously passes the wall and ceiling shell. It is also to be mentioned here that double-shelled halls supported by compressed air are known as covers for indoor swimming pools. In these known structures, openings in the inner skin for receiving circulated and exhaust air through passages between the inner and outer skins are provided on a higher level than openings for exhausting the circulated and exhaust air between inner and outer skins so that the circulated and exhaust air flowing through the openings in the inner skin flows downward in the space between inner skin and outer skin, openings for supplying additional fresh air being provided optionally in the outer skin, in the foundation, or in a conduit. However, this known design does not suggest the invention because the known construction not only starts from a different set of problems to be solved, but also uses different paths to the solution of the problems.

In order to illustrate the invention, it is being explained in more detail with reference to several embodiments illustrated in the appended drawing wherein.

Figure 1:
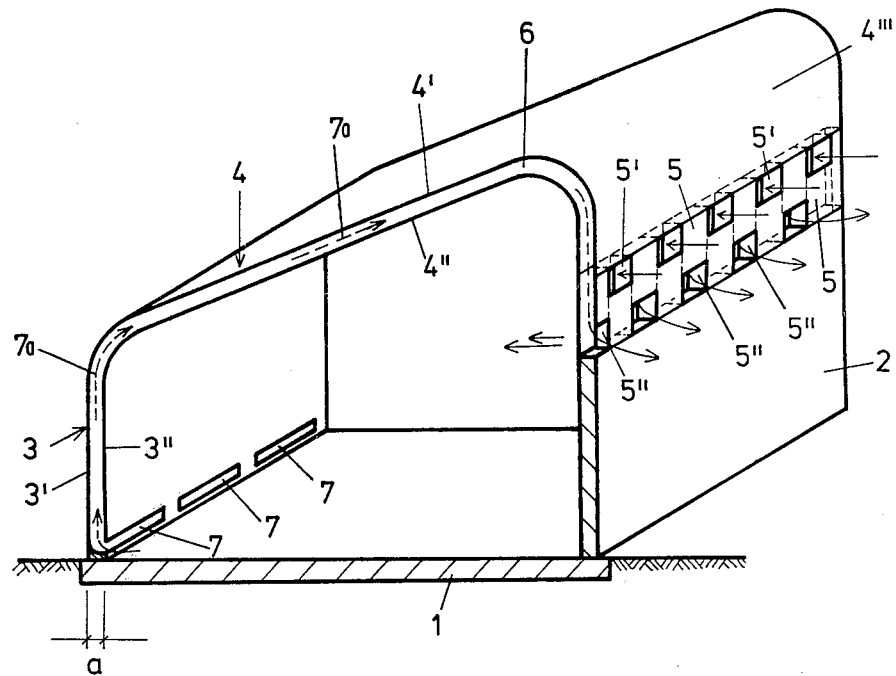
FIG. 1 shows a rectangular stable building in a perspective, sectional view.

FIG. 1 illustrates the basic concept of the invention with reference to a stable building shown in a simplified manner. This building, shown in section and in a perspective view, has a stable floor 1 which may be subdivided into boxes and also contains discharge gutters for the animal excrements, as is not illustrated specifically. Moreover, the building has a vertical wall section 2 which may be conventionally constructed (concrete wall, brick wall, wood construction, frame work or the like). Another, vertically extending building wall 3 and the roof 4 which merge smoothly, consist each of an outer shell 3', 4' and an inner shell 3", 4" arranged at a distance from the outer shell. The ceiling or roof section on the side of the conventionally constructed wall section 2 is drawn down here in the manner of an apron 4''' and, jointly with the upper edge of the wall section 2, bounds an opening into which a heat exchanger 5 is set. The internal design of this heat exchanger 5 which cooperates with a blower, not illustrated here, is of secondary importance. Fresh air inlet openings 5' of the heat exchanger lead from the ambient atmosphere into the interior of the stable, and exhaust discharge openings 5" are connected with the internal space 6 of the double-shelled building section 3, 4 by the internal elements of this heat exchanger. Slit-shaped openings 7 are provided near the stable floor 1 in the inner wall shell 3". Non-illustrated air-deflecting baffles which provide uniform distribution of the entering fresh air may be provided near the heat exchanger 5 on the ceiling section 4 within the stable interior. The wall and ceiling shells 3', 4' and 3", 4" are made of thin-walled material and consist, for example, of asbestos-cement, of sheet aluminum, or of plastic panels. It is also possible to use an air-supported construction which is not to be excluded from this invention.

The operation of such a stable building in winter is now to be considered briefly. The cold, fresh air is drawn or pressed into the interior of the stable from the ambient atmosphere by fans, not shown, passing through the heat exchanger 5. This cold fresh or additional air is warmed in the stable by the animals sheltered therein and is enriched with water vapor (breath, evaporation, excretion) and dust. The warmed, moisture-rich air flows as exhaust air through the openings 7 near the floor into the space 6 bounded by the building shells 3', 3", 4', 4", and the exhaust air then moves in the direction of the arrows 7a in FIG. 1 first upward, thereafter obliquely through the ceiling and then over the apron 4 into the heat exchanger 5. Deflecting baffles for the passing air may be provided in this space 6 between the building shells and serve for generating suitable turbulence in the passing air so that as many air particles enriched with moisture as possible are led to the outer shell 3', 4'. These air particles are somewhat cooled by contact with the externally air-cooled outer shell and yield water vapor as a condensate which precipitates on the inner face of the outer shell from where this precipitate runs back into the stable. The exhaust air thus is dried on its way from the openings 7 to the heat exchanger 5, and this dried air additionally transmits a portion of its heat content to the entering supplemental or fresh air during passage through the heat exchanger. Because the water vapor was removed from the exhaust air on its way to the heat exchanger by condensation, the heat exchanger cannot be frozen shut or frozen up even in cold weather. The dust particles also settle during passage through the double-shelled building sections, and this settling process can be enhanced by the installation of directing and controlling baffles in the space 6. Flap-closed openings may be provided in the outer roof or wall shell 3', 4' for flushing the internal space if it should be contaminated excessively by dust deposits.

Figure 2:
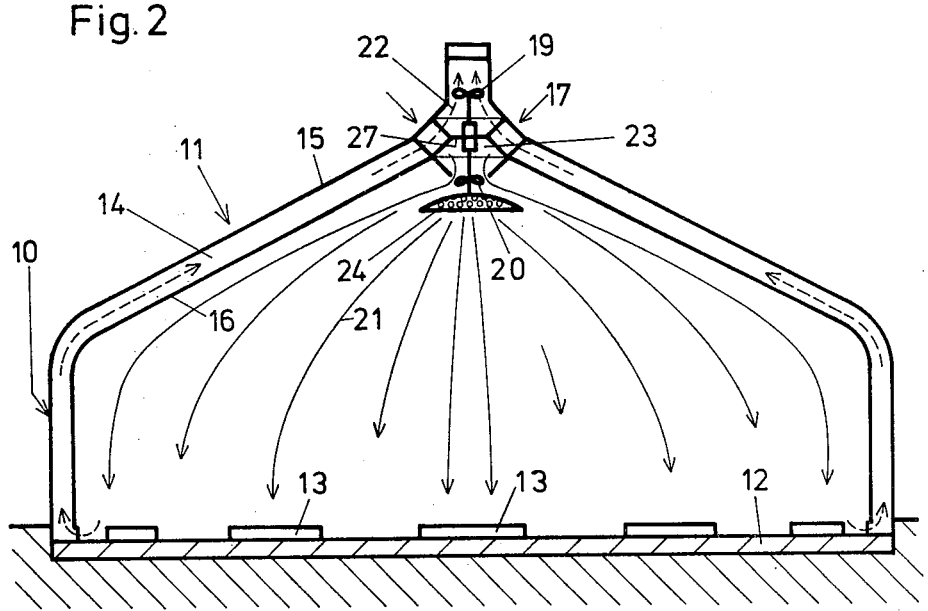
FIG. 2 is an elevational section of a rotationally symmetrical stable building.

FIG. 2 shows a stable building having a shape of substantially rotational symmetry in elevational section. The building wall 10 and building ceiling 11 directly merge and constitute a dome or cupola-like super-structure. The entire structure here is of double-shell design, and openings 13 for the passage of exhaust air into the internal wall and ceiling space 14 are provided near the stable floor 12 and uniformly distributed in the inner shell along its circumference. An opening passing through both shells 15, 16 is located in the axis of symmetry at the top of this dome- or cupola-shaped superstructure, and the heat exchanger 17 is set into it. The heat exchanger 17 is weatherproof. Blowers 19, 20 actuate the forced ventilation. The direction of supplemental air flow is indicated by arrows 21 in fully drawn lines, that of the exhaust air by arrows 22 in broken lines. An air distributor 24 in the manner of a canopy is arranged below the fresh air inlet opening 23 and has numerous perforations so that the fresh air of high specific gravity not only drops down directly, but is also deflected laterally as indicated by the illustrated arrows so that the stable space in its entirety is fed fresh air uniformly.

Figure 4:
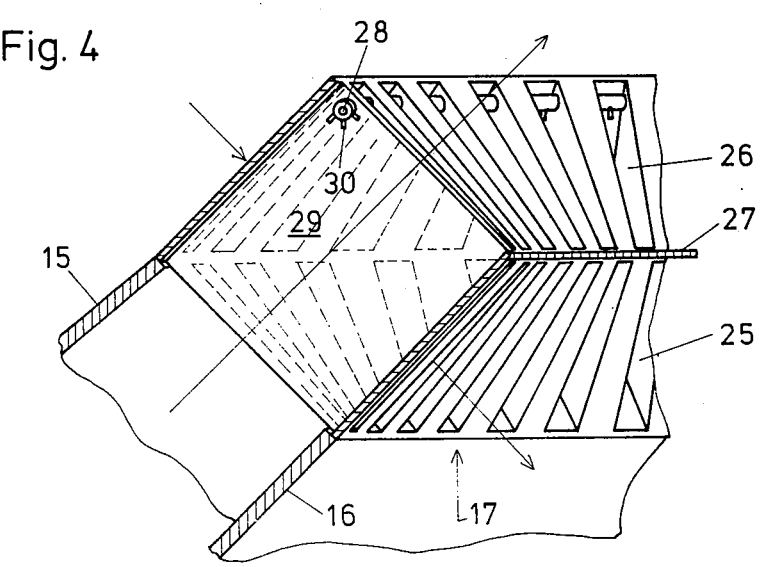
FIG. 4 shows a detail of a heat exchanger in cross section on a larger scale and its direct connection to the double-shelled building wall.

An embodiment of the heat exchanger 17 is illustrated in cross section and on a larger scale in FIG. 4. It is shaped in the manner of a hollow ring of quadratic cross section. The fresh air enters through slot-shaped chambers 25 in the heat exchanger 17, and exhaust air is discharged through openings 26 of chambers 29 similar to the chambers 25 and circumferentially alternating with the latter in the heat exchanger. A partition plate 27 seals the center of the ring shape and separates outer and inner spaces. The wall shells 15, 16 are linked up directly to the heat exchanger. To permit cleaning of the chambers 29 of the heat exchanger 17 passed by the exhaust air, a circular, annular conduit 28 is built into the heat exchanger. This annular conduit carries one or several nozzles 30 in each of the exhaust air openings 26. When the conduit 28 is supplied with water, the water is discharged from the nozzles and flushes dust from the chamber. Because of the chosen arrangement evident from FIG. 4, this rinsing water runs from the heat exchanger to the wall shell 16 and from there downward and thereby also cleans this wall shell 16 of dust. In the embodiment discussed here, the heat exchanger is designed in the shape of a ring, that is, it appears as a circular ring in top plan view. It is also possible, of course, to make the top opening of the building rectangular or square, and to design the heat exchanger correspondingly so that it frames the opening.

Figure 3:
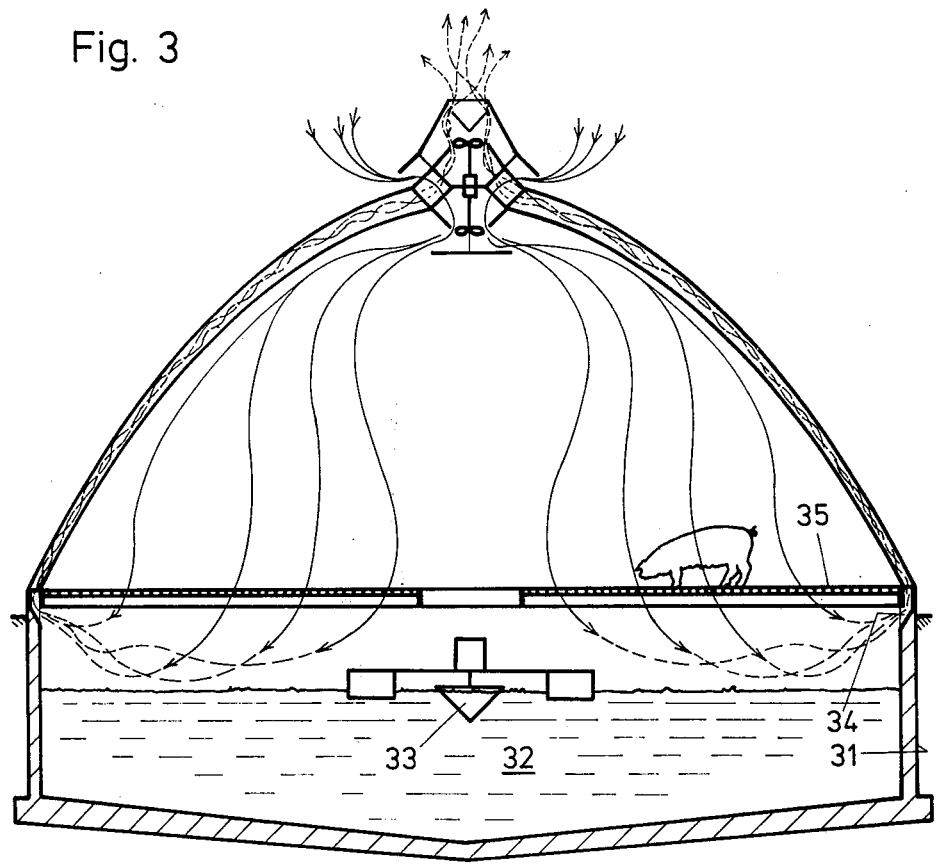
FIG. 3 is an elevational section of a further stable building including a receiving chamber for liquid manure below the stable floor.

A further embodiment of the invention is shown in FIG. 3 in elevational section. The superstructure corresponds substantially to that described with reference to FIG. 2. The shell shape deviates to a small extent, but this is relevant only to the extent that this shape appears statically more advantageous. As to the heat exchanger employed here, the above description holds. A significant difference consists in that the dome- or cupola-like, double-shelled superstructure rests on foundation walls 31 which serve as circumferential walls of a collecting and oxidizing chamber 32 for liquid manure in which chamber a floating impeller mixer 33 is arranged. The inlet openings 34 for the exhaust air are located below a slotted floor 35. The openings are uniformly distributed about the circumference of the chamber 32. It is evident from the drawing that both the aqueous condensate which precipitates on the outer shell during the cold season and the rinsing water from the heat exchanger can run back into the manure chamber where it is available for processing the manure so that substantial amounts of water that had to be used heretofore can be saved. The illustrated embodiments are shown without doors, windows, light admitting openings, and the like, but such devices, of course, can be installed everywhere.

The shell-like construction of the building also favors a desirable stable climate in summer. The space between the wall and ceiling shells is always being passed by exhaust air which uniformly removes the incident solar heat so that no heat will accumulate in these stable spaces despite the total absence of thermal insulation. The heat exchanger shown in FIG. 4 has a rinsing water conduit 28 provided within the cross section of the heat exchanger. It would also be possible to arrange this water conduit outside the heat exchanger, particularly above the discharge openings 26 for the exhaust air. Branch pipes could then be led from the water conduit into the exhaust air chambers 29 of the heat exchanger.

Aside from cleaning the heat exchanger, the inner surface of the shell may be wetted in this manner. Large wet surfaces serve for purification of the air, the dust particles are precipitated. Because dust particles are carriers of smell, such a precipitation of dust is extraordinarily advantageous because such installations can also be employed in densely populated areas.

We claim:
1. A stable building comprising:
 (a) wall means bounding an animal shelter in said building and normally separating said animal shelter from the ambient atmosphere,
  (1) a vertically extending portion of said wall means including an outer shell and an inner shell defining a space therebetween,
  (2) said inner shell being formed with an opening connecting said space with said shelter; and
 (b) heat exchanger means mounted on said wall means and defining first and second, separate conduits,
  (1) said first conduit connecting a portion of said space remote from said opening with said atmosphere for discharge of exhaust air from said shelter,
  (2) said second conduit connecting said atmosphere with said shelter for flow of fresh air into said shelter in thermal contact with said exhaust air.
2. A building as set forth in claim 1, wherein said outer shell has inner and outer faces exposed to said exhaust air in said space and said atmosphere respectively and consists essentially of thermally conductive material.
3. A building as set forth in claim 2, wherein said portion of said space is upwardly spaced from said opening.
4. A building as set forth in claim 1, wherein said wall means include a ceiling upwardly bounding said animal shelter, said heat exchanger means being mounted on said ceiling.

5. A building as set forth in claim 4, wherein said ceiling includes respective parts of said shells and is formed with a vertical passage therethrough, said heat exchanger means being set in said passage.

6. A building as set forth in claim 4, wherein said ceiling tapers in an upward direction, said heat exchanger means being mounted on the topmost portion of said ceiling.

7. A building as set forth in claim 6, wherein said wall means are at least approximately symmetrical relative to a vertical axis passing through said topmost portion.

8. A building as set forth in claim 1, wherein said wall means include an apertured, horizontally extending bottom wall separating an upper portion of said shelter from an excrement-collecting chamber portion of said shelter, said opening directly connecting said chamber portion with said space.

9. A building as set forth in claim 8, wherein said chamber portion is bounded horizontally by a circumferential portion of said wall means, said inner and outer shells being supported on said circumferential portion and extending upward therefrom.

10. A building as set forth in claim 1, further comprising rinsing means for discharging rinsing liquid into said first conduit.

11. A building as set forth in claim 10, wherein said first conduit slopes downwardly toward said space for flow of rinsing liquid from said first conduit into said space, said portion of said space being spaced downwardly from said heat exchanger means for receiving said rinsing liquid from said space.

12. A building as set forth in claim 11, wherein said rinsing means include a source of rinse water and a nozzle in said first conduit communicating with said source for discharge of said rinse water into said first conduit.

* * * * *